Feb. 11, 1969     HANNS-PETER PASCHKE     3,426,692
ROTARY PISTON MACHINE
Filed June 19, 1967
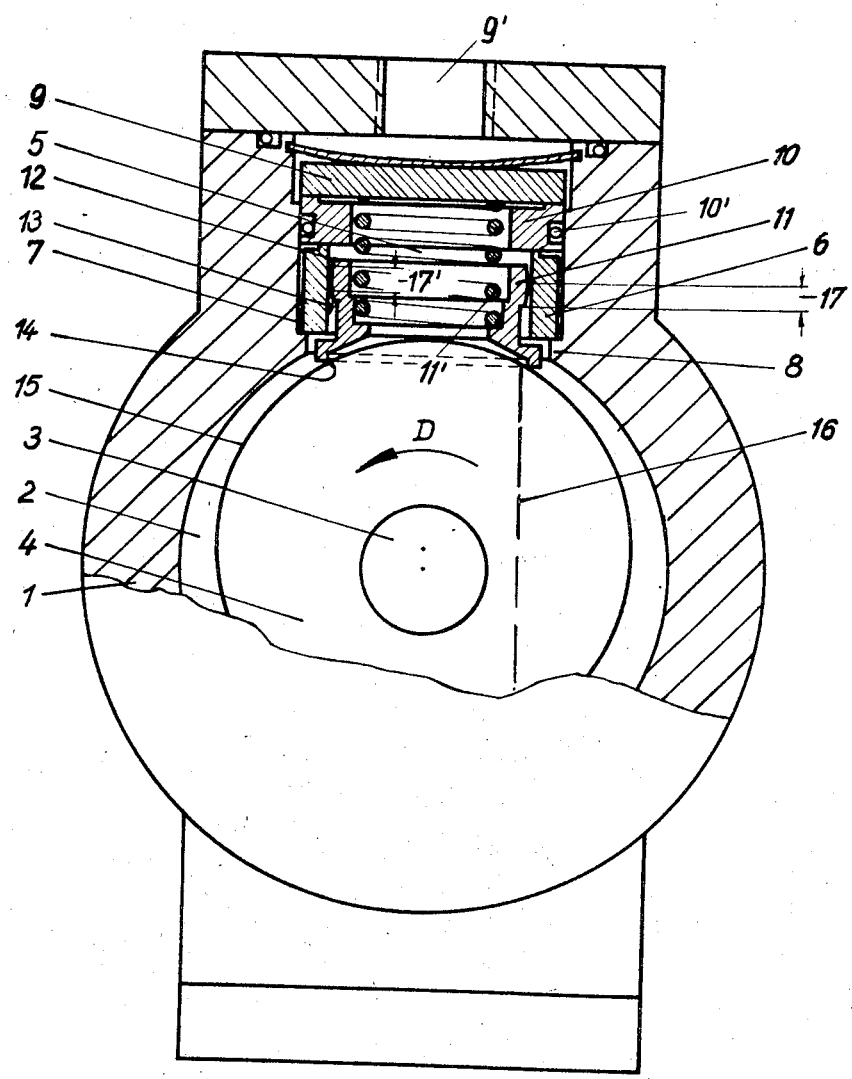
INVENTOR
HANNS-PETER PASCHKE
BY
ATTORNEYS United States Patent Office 3,426,692
Patented Feb. 11, 1969

3,426,692
ROTARY PISTON MACHINE
Hanns-Peter Paschke, Olgaweg 6, Neckarsulm, Germany
Filed June 19, 1967, Ser. No. 646,919
Claims priority, application Germany, June 20, 1966,
P 39,750
U.S. Cl. 103—116                                2 Claims
Int. Cl. F04b 9/04, 19/22; F01b 9/06

ABSTRACT OF THE DISCLOSURE

A rotary mechanism capable of generating a variable volume, and thus is capable of being employed as a pump or motor for liquid or gaseous media. It generally comprises an outer body having a cavity and an inner body formed as a spherical eccentric and mounted on a shaft for rotation within the cavity with respect to the outer body. The outer body comprises at least one working chamber open toward the inner body and provided with a liner having a cylindrical internal wall. An annular seal element is arranged for tilting and reciprocating movement within the liner and has a spherical outer surface for sealing cooperation with the cylindrical wall of the liner. One of the annular end faces of the seal element is slidable on the outer peripheral surface of the inner body.

Background of the invention

The present invention concerns a rotary mechanism capable of generating a variable volume, and thus is capable of being employed as a pump or motor for liquid or gaseous media.

In particular the present invention concerns a rotary mechanism comprising an outer body having a cavity and an inner body formed as a spherical eccentric and mounted on a shaft for rotation within the cavity with respect to the outer body. The outer body comprises at least one working chamber open towards the inner body and is provided with a liner having a cylindrical internal wall. An annular seal element is arranged for tilting and reciprocating movement within the liner and has a spherical outer surface for sealing cooperation with the cylindrical wall of the liner and with one of its annular end faces slidable on the outer peripheral surface of the inner body.

In such a mechanism the sealing cooperation between the seal element and the liner is essential for obtaining a high efficiency. If the thickness of the annular seal element is so dimensioned that the seal element can expand under the pressure of the working medium such that a more or less absolute sealing effect is obtained at the desired maximum pressure, in the lower pressure range a relatively large gap between the sealing element and the liner exists which results in considerable leakage.

Summary of the invention

It is a primary object of the invention to improve the tightness of such rotary mechanisms. For this purpose the liner is inserted in the working chamber with a certain radial play and the liner and the annular seal element are formed in such a way and are made of such material that at least in the sealing region the product of the modulus of elasticity and the thickness of the wall is for the liner greater than the annular seal element. The phrase "sealing region" is the region over which the annular seal element and the liner cooperate during the rotation of the inner body.

The invention enables the annular seal element as well as the liner to expand under the pressure of the working medium whereby the expansion of the liner is less than the expansion of the annular seal element. In consequence thereof the play on assembling between the seal element and the liner can be small whereby the sealing effect in the lower and medium pressure range is improved. Furthermore, the speed of the working medium in the gap between the sealing annulus and the liner is reduced and therewith also the leakage because a part of the working pressure is consumed for expanding the liner so that only a residual pressure is available for conversion into speed.

If the same material is used for the seal element and for the liner, the thickness of the wall of the liner must be larger than the thickness of the wall of the annular seal element. The amount of the difference of the thickness of the walls depends entirely on the desired maximum pressure at which the gap between the annular seal element and the liner shall be zero or almost zero.

For sealing the annular gap created by the radial play of the liner in the working chamber, a seal means may be provided at the end of the liner opposite to the inner body.

Further details and features of the invention will appear from the following description which is to be taken in conjunction with the accompanying drawing, in which an embodiment of the invention is represented, by way of example.

Brief description of the drawing

The drawing shows a partial sectional view of a rotary mechanism embodying the invention.

Description of the preferred embodiment

The embodiment shown in the accompanying drawing includes a housing or outer body 1 having a cavity 2 which is traversed by a shaft 3 which carries a spherical eccentric or inner body 4. The cavity 2 includes a working chamber 5 which is open towards eccentric 4. A cylindrical liner is inserted in working chamber 5 with radial play 7. Liner 6 abuts on an annular cylinder head 10 which is sealed towards the inner wall of working chamber 5 by a sealing ring 10'.

Sealing ring 10' seals, together with the cylinder head 10, the annular gap created by the radial play 7. The cylinder head 10 is covered by a spring loaded outlet valve 9. Outlet connection 9' is provided for the working medium.

An annular seal element 11 is arranged within liner 6 and has a spherical outer surface 12 for sealing cooperation with the cylindrical inner wall 13 of liner 6. The seal element 11 slides with its annular end face 14 in sealing manner on the peripheral surface 15 of eccentric 4, and is urged onto this surface by a spring 11'.

An inlet port 16 is provided in the peripheral surface 14 of eccentric 4 and connects periodically the interior of cavity 2 with working chamber 5. An inlet connection (not shown) for the working medium opens into cavity 2.

In the position shown in the drawing, eccentric 4 is in its top dead center position with respect to working chamber 5. Outlet valve 9 is already closed and inlet port 16 is about to come into communication with working chamber 5 after a small amount of further rotation of eccentric 4 in the direction of arrow D. On rotation of eccentric 4 the volume of working chamber 5 is periodically varied. Seal element 11 thereby performs a reciprocating as well as a tilting movement.

The region of liner 6 over which seal element 11 is in sealing engagement during rotation of eccentric 4 is designated by the reference number 17 and the corresponding region of seal element 11 is designated by the reference number 17'. At least in these regions, which are called sealing regions, liner 6 and seal element 11 are so formed and are made of such material that the product of the modulus of elasticity of the material used and the wall thickness if larger for liner 6 than for seal element 11. In the shown embodiment, it is assumed that both liner 6 and seal element 11 are composed of the same material and, therefore, have the same modulus of elasticity. Accordingly, the thickness of the wall of liner 6 in the sealing region 17 is larger than the thickness of the annular seal element 11 in its sealing region 17'. The resultant effect is that the seal element 11 expands a greater amount under the working pressure than does liner 6 such that at maximum pressure for which the pump is designed a gap in the order of a few microns exists between the outer surface of seal element 11 and the inner cylindrical wall on liner 6. The thickness of the walls of liner 6 and of the annular seal element 11 is chosen in such a way that the outer diameter of seal element 11 in sealing region 17', at maximum working pressure, is larger than the inner diameter of liner 6 in its sealing region 17 at zero pressure.

Thus, among others, the several aforenoted objects and advantages are most effectively attained. Although a somewhat preferred embodiment has been shown and described herein, it should be understood that this invention is in no sense limited thereby but its scope is to be determined by the appended claims.

I claim:
1. A rotary mechanism comprising an outer body having a cavity, an inner body formed as a spherical eccentric and carried by a shaft for rotation within the cavity with respect to the outer body, said outer body having at least one working chamber open towards the inner body and being provided with a liner having a cylindrical inner wall, an annular seal element arranged for tilting and reciprocating movement within the liner and having a spherical outer surface for sealing engagement with the cylindrical wall of the liner and sliding with one of its annular end faces on the outer peripheral surface of the inner body, the liner being inserted with radial play in the working chamber, and the liner and seal element are formed in such a way and are made of such material that at least in the sealing region the product of the modulus of elasticity and the thickness of the wall is greater for the liner than for the seal element.

2. A rotary mechanism according to claim 1, wherein a sealing means is provided at the end of the liner opposite to the inner body for sealing the gap created by the play with which the liner is inserted in the working chamber.

References Cited

UNITED STATES PATENTS

| | | | |
|---|---|---|---|
| 1,568,170 | 1/1926 | Bret | 103—157 |
| 2,111,000 | 3/1938 | Moulet | 103—116 |
| 2,518,473 | 8/1950 | Hogeman et al. | 103—157 |
| 2,544,561 | 3/1951 | Meyer | 103—157 |
| 2,614,494 | 10/1952 | Voit et al. | 103—157 |

FOREIGN PATENTS 813,747    5/1959    Great Britain.

DONLEY J. STOCKING, *Primary Examiner.*

WILBUR J. GOODLIN, *Assistant Examiner.*

U.S. Cl. X.R.

103—157